United States Patent [19]

Marzluf

[11] Patent Number: 4,580,525
[45] Date of Patent: Apr. 8, 1986

[54] ELECTRICAL FISH CHASING DEVICE

[75] Inventor: Werner Marzluf, Rheinstetten, Fed. Rep. of Germany

[73] Assignee: Maschinenfabrik Helmut Geiger GmbH, Karlsruhe, Fed. Rep. of Germany

[21] Appl. No.: 650,367

[22] Filed: Sep. 13, 1984

[30] Foreign Application Priority Data

Aug. 1, 1984 [DE] Fed. Rep. of Germany ....... 3428363

[51] Int. Cl.⁴ ............................................ A01M 29/00
[52] U.S. Cl. ...................................................... 119/3
[58] Field of Search ............................. 119/3; 340/852

[56] References Cited

U.S. PATENT DOCUMENTS

| | | | |
|---|---|---|---|
| 2,426,037 | 8/1947 | Mahoney et al. | 119/3 X |
| 2,605,742 | 8/1952 | Burkey | 119/3 |
| 2,991,421 | 7/1961 | Volz | 340/852 |

Primary Examiner—Hugh R. Chamblee
Attorney, Agent, or Firm—Marmorek, Guttman & Rubenstein

[57] ABSTRACT

An electric fish-scaring device for water inlet and discharge plants includes electrodes positioned below the surface of the water and connected to a voltage supply unit. To enable the device to operate effectively in scaring away fish of different respective sizes, the voltage supply unit is coupled to an automatic control unit for the generation of different voltage pulses.

12 Claims, 6 Drawing Figures

ELECTRICAL FISH CHASING DEVICE

The invention relates to an electric fish-scaring device, intended particularly for water inlet and extraction structures, in which electodes are placed below the surface of the water and connected to a voltage supply unit which produces a pulsed voltage pattern.

To avoid plant malfunctions and damage to the environment due to the destruction of aquatic organisms, and fish especially, it is often necessary to install fish-scaring devices close to water inlet and extraction structures.

The elements of familiar electric fish-scaring devices include a number of electrodes placed below the water which are connected to a d.c. or a.c. voltage supply unit which produces a pulsed voltage pattern with corresponding variations in the strength of the resulting electrical field.

A disadvantage of the already familiar fish-scaring devices of the type described above seems to be that, after comprehensive measurements and adjustments are carried out when the equipment is placed into service, it is then kept in operation with virtually no further supervision, with the result that any change in conditions or reduced effectiveness of the equipment in scaring fish is only noticed when considerable damage has already occurred.

Such variations in the ability of the equipment to scare fish may be due not only to alterations in the electrode characteristics, for example a build-up of their surface resistance, but also to any changes in the characteristics of the composition of the water and the distribution of organisms.

With the familiar fish-scaring devices the aim is to match the scaring action to the prevalent class of fish.

However, a reduction in the scaring action of the equipment may be due to the occurrence of other classes of fish for which the preset pulsed voltage pattern has little scaring effect. It is also true that other classes of fish occur simultaneously with, or during periodical fluctuations in place of, the prevalent fish class, and here it is unfortunate that we generally have no knowledge of the distribution of the various classes of fish. A further point is that the distribution of classes of fish can vary from year to year.

The purpose of the invention is an electric fish-scaring device designed to act on different classes of fish simultaneously. This problem has been solved by coupling the voltage supply unit to an automatic control unit which varies the voltage pulses. This enables the effectiveness of the fish-scaring device to be extended to classes of fish with differing respective responses. In addition, any changes in the composition of the water and the electrodes are compensated without requiring any readjustment.

By exercising the aforementioned kind of automatic control over the voltage supply unit and hence over the electrical field, the repellent action is produced by a variety of pulses which render the equipment effective in respect of various classes of fish regardless of any changes in the characteristics of the electrodes, the water and the distribution of organisms.

In this description, the term 'pulse sequence' means a succession of identical pulses, characterized primarily by their identical repetition frequency. A variety of pulse sequences differing in repetition frequency, amplitude, duration etc. can then be made to follow each other. Whereas the conventional fish-scaring devices are operated with identical pulses in a sequence of unlimited duration, with the scaring device, according to the invention, the pulses are varied and may, for example, be generated in the form of pulse sequences of limited duration which differ in their repetition frequency. Each individual phase sequence may, for example, comprise only a few pulses. Pulse sequences of equal overall duration but differing repetition frequency or pulse sequences of respective unequal durations can be made to follow each other. Intervals may also be inserted to advantage between the pulse sequences.

Where the conditions in water inlet and discharge plants are unknown or subject to marked variations, it is helpful, within a given frequency range, to control the repetition frequency of the pulses with a random generator. It is then advisable to arrange for short pulse sequences of identical repetition frequency to be generated from time to time.

By the application of the invention to different classes of fish, the supervision of fish-scaring equipment can to a large extent be dispensed with, and the voltage supply can be controlled in such a way as to ensure economic operation with optimum repellent action at all times.

The invention will be better understood when consideration is given to the following detailed description thereof. Such description makes reference to the annexed drawing wherein.

Figure 1:
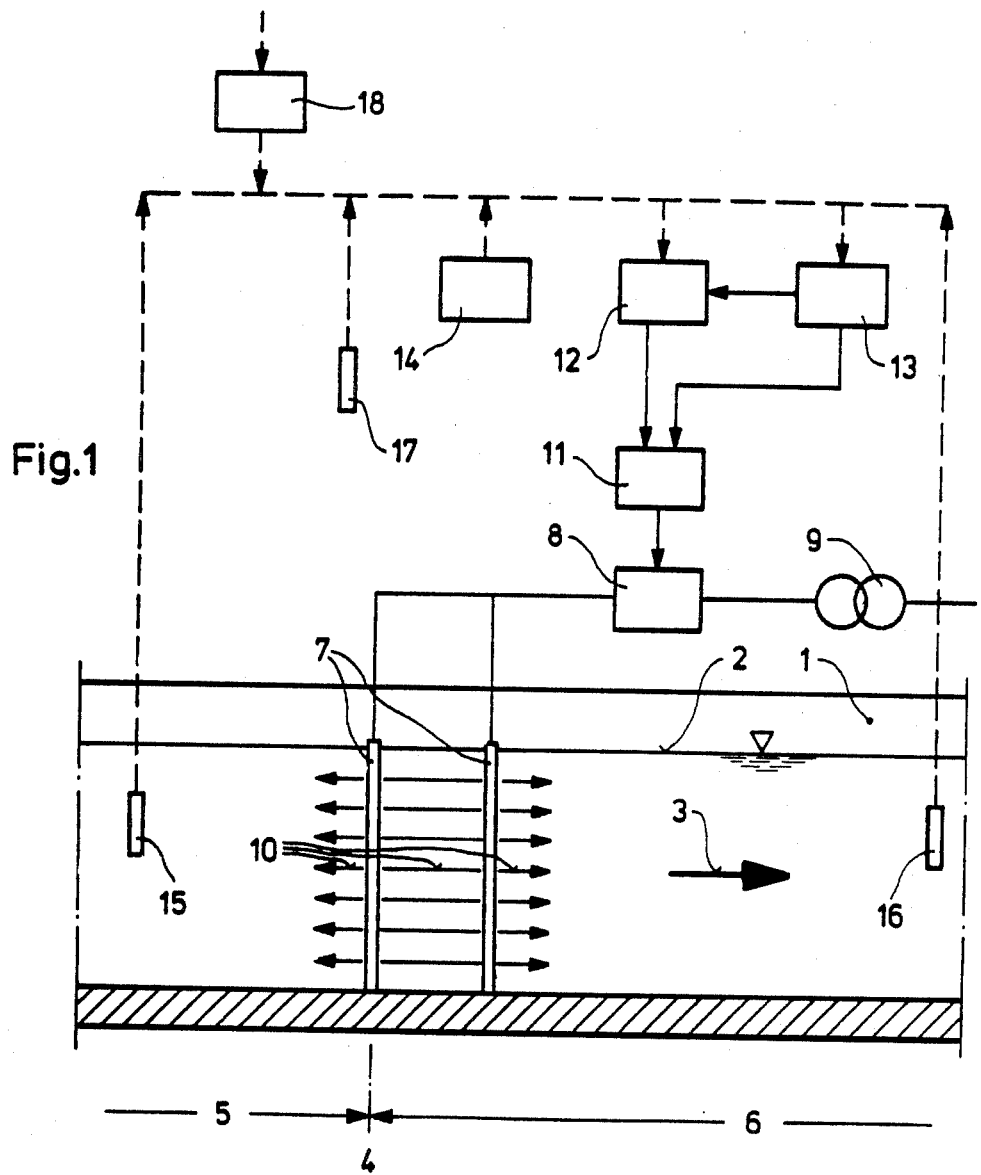
FIG. 1 represents schematically an example of the application of the invention.

Describing now the drawings, in FIG. 1, a structure (1), which represents schematically a water inlet or discharge plant, includes still or flowing water (3) defining a surface (2). The plant or structure (1) is divided by a barrier (4) into an unprotected area (5) and a protected area (6). At the barrier (4), electrodes (7) are mounted below the surface of the water (2) and are connected to a voltage supply unit (8). This unit (8) is supplied, for example, via a transformer (9) and sets up an electrical field (10) near the electrodes (7). The voltage supply unit (8) is coupled to an automatic control unit (11), which varies the voltage pattern and the pulses of the field (10). The input to the control unit (11) is regulated by a single appliance or alternatively by a number of linked appliances. Either the control unit (11) is equipped with an internal programming unit or a separate, external programming unit (12) is provided. This internal or external programming unit (12) can regulate the input to the control unit (11) in accordance either with a fixed program or with instructions received from a process control computer (13), a data base (14), an external control system (18) or transducers (15, 16, 17). Again, the process control computer can be used, where appropriate, to regulate directly the input to the control unit (11). The process control computer (13) can combine values from a data base (14) with data supplied by transducers (17) in the neighbourhood and others (15, 16) in the unprotected and/or protected area (5,6) of the water and then guide the repellent action via the control unit (11). Often the equipment is also coupled to an external control system (18), thereby establishing a link with the operation of the whole facility served by the fish-scaring device. This may relate, for example, to capacity-dependent parameters and operating conditions affecting the whole facility.

FIGS. 2-6 illustrate the various sequences of pulses which are utilized in the instant invention. In the Figures, the symbol S means a series of pulses, and the symbol I means an interval.

Figure 2:
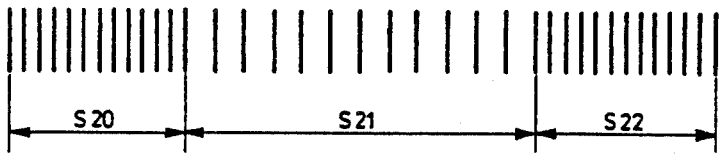
FIGS. 2–6 depict examples of the various pulse sequences which can be generated with the device of the instant invention.
Figure 3:
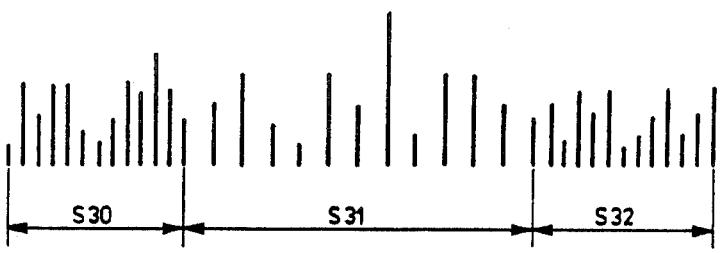
Figure 4:
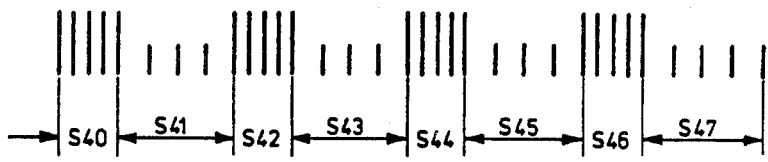
Figure 5:
Figure 6:
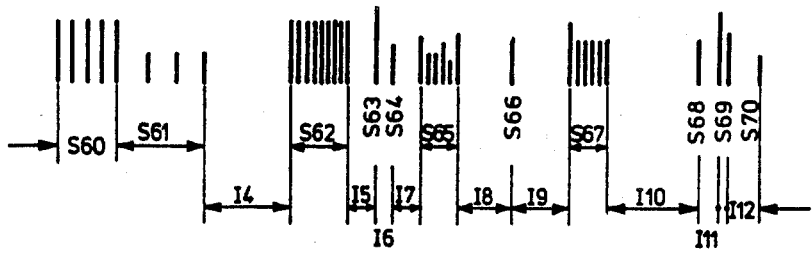

FIG. 2 shows three intervals S20, S21 and S22, with a constant frequency for each series of pulses. All of the pulses have the same amplitude. FIG. 3 shows three series of pulses wherein the pulses in each series have different magnitudes but identical repetition frequencies. FIG. 4 combines elements of FIGS. 2 and 3. FIGS. 5 and 6 show the use of intervals which are free of pulses.

The fish-scaring device in accordance with the invention has further advantages:

With conventional repellent devices, organisms have a marked tendency to become accustomed or adapted to the repellent action, even though this may originally have been adjusted to give optimum results when the equipment was placed in service. When the electrical field is subjected to variable pulses, this adaptation is either absent or greatly reduced, so that the action of the fish-scaring device in accordance with the invention is much more reliable and permanent.

The generation of the electrical field which exerts the repellent action requires a permanent supply of electrical power, and the magnitude thereof is considerable with conventional repellent equipment, amounting possibly to some hundreds of kilowatts. In comparable circumstances, the fish-scaring device according to the invention can save energy and result in reduced investment costs due to a lower output. The saving is due to the fact that the pulses are generally varied in such a way that pulses having a lower repetition frequency are interposed from time to time. The power used in generating the pulses is reduced in the same measure, since the power is, amongst other things, proportional to the repetition frequency.

Another advantage offered by the invention is the possibility of selecting and optimizing pulse sequences to suit different respective classes of fish. The various classes of fish also require an optimum pulse sequence to be maintained for the most favourable period in each case. It is therefore advisable to arrange for pulse sequences of different respective repetition frequencies to last for different respective periods, if this is found to optimize the repellent effect of the scaring devices on the classes of fish actually encountered.

I claim:

1. An electric device for forming an electrified water zone to prevent fish from entering said zone, comprising a series of electrodes protruding below the surface of the water and located near the region of said zone, said electrodes being operatively connected to each other to produce a common electric field when said electrodes are simultaneously energized, a voltage supply connected to said electrodes, means coupled to said voltage supply for simultaneously energizing said electrodes to produce a series of pulses in said common electric field, and automatic control means connected to said voltage supply for varying the characteristics of said pulses and the intervals between said pulses.

2. The electric device as claimed in claim 1, wherein said pulses have a certain repetition frequency, and wherein said automatic control means includes frequency regulation means for varying the repetition frequency of said pulses.

3. The electric device as claimed in claim 1, wherein said repetition frequency is variable within a range of about 0.5 Hz to about 60 Hz.

4. The electric device as claimed in claim 1, further comprising a process control computer connected to an input of said automatic control means.

5. The electric device as claimed in claim 1, further comprising a random generator having an output thereof connected to an input of said automatic control means for varying the characteristics of said pulses.

6. The electric device as claimed in claim 1, further comprising programming means connected to an input of said control means.

7. The electric device as claimed in claim 6, wherein said programming means is disposed exteriorly of said control means.

8. The electric device as claimed in claim 6, wherein said programming means is disposed interiorly of said control means.

9. The electric device as claimed in claim 1, wherein said series of pulses includes a set of pulses of limited duration, the pulses in said set all having the same repetition frequency.

10. The electric device as claimed in claim 9, further including an additional set of pulses, said sets being spaced from one another by a predetermined time interval.

11. The electric device as claimed in claim 9, wherein the pulses in said set are few in number.

12. The electric device as claimed in claim 11, wherein the pulses in said set include 2 to 10 pulses.

* * * * *